US008933372B2

(12) United States Patent
King

(10) Patent No.: US 8,933,372 B2
(45) Date of Patent: Jan. 13, 2015

(54) ENGINE PRE-HEATER SYSTEM

(75) Inventor: Ray King, Ajax (CA)

(73) Assignee: Dynacurrent Technologies, Inc. (CA)

( * ) Notice: Subject to any disclaimer, the term of this patent is extended or adjusted under 35 U.S.C. 154(b) by 190 days.

(21) Appl. No.: 12/457,397

(22) Filed: Jun. 10, 2009

(65) Prior Publication Data

US 2013/0206744 A1 Aug. 15, 2013

Related U.S. Application Data

(63) Continuation-in-part of application No. 11/427,545, filed on Jun. 29, 2006, now abandoned.

(51) Int. Cl.
*B60L 1/02* (2006.01)
*B60H 1/03* (2006.01)
(Continued)

(52) U.S. Cl.
CPC ............. *F02N 19/10* (2013.01); *F01P 2037/02* (2013.01); *F01P 2060/18* (2013.01)
USPC ..... 219/208; 219/202; 219/205; 123/142.5 R; 237/12.3 R; 417/207; 417/208; 417/209; 99/281

(58) Field of Classification Search
CPC ........... F02N 19/10; F02N 19/02; H05B 3/06; B60H 1/0025; B60H 1/00642; B60H 1/2218; B60H 1/00657; G05D 23/1904; B60L 1/02
USPC ................... 219/208, 202, 205; 123/142.5 E, 123/142.5 R; 237/12.3 R; 165/51, 271; 417/207–209; 99/281
See application file for complete search history.

(56) References Cited

U.S. PATENT DOCUMENTS

| | | | |
|---|---|---|---|
| 1,376,509 | A | 5/1921 | Borst, Jr. |
| 1,458,666 | A | 3/1924 | Harding |

(Continued)

FOREIGN PATENT DOCUMENTS

| | | |
|---|---|---|
| CA | 2017503 | 11/1990 |
| CA | 2668817 | 12/2010 |

(Continued)

OTHER PUBLICATIONS

Written Opinion of the International Searching Authority ; PCT/CA2007/001145; 5 pages; Oct. 5, 2007.

(Continued)

*Primary Examiner* — Dana Ross
*Assistant Examiner* — Gyounghyun Bae
(74) *Attorney, Agent, or Firm* — Schmeiser, Olsen & Watts, LLP

(57) ABSTRACT

An engine pre-heater system comprising a housing having a passage extending therethrough for passage of coolant through the pre-heater. The housing provides at least one opening defined therein separate from the passage, and an electric heating element is inserted therein, the heating element projecting into the passage whereby the heating element is in direct contact with the coolant to heat it. The heating element is supplied with electrical power from a power source for enabling it to heat the coolant, and a lower end of the heating element is L-shaped, the lower end thus being substantially perpendicular in relationship to the remainder of the heating element, giving the heating element a greater surface area with which to contact, and thus heat the coolant. The engine pre-heater system is also operably able to heat the coolant, engine oil and transmission oil, therefore heating the coolant and warming the engine in a faster and more efficient manner for quick start-ups.

13 Claims, 4 Drawing Sheets

(51) Int. Cl.

| | |
|---|---|
| ***B60H 1/00*** | (2006.01) |
| ***F04B 19/24*** | (2006.01) |
| ***A47J 31/047*** | (2006.01) |
| ***F02N 19/10*** | (2010.01) |

(56) References Cited

U.S. PATENT DOCUMENTS

| | | | | | |
|---|---|---|---|---|---|
| 1,485,667 | A | | 3/1924 | Harding | |
| 1,505,179 | A | * | 8/1924 | Whiteley | 219/208 |
| 1,509,207 | A | | 9/1924 | Hudson | |
| 1,511,779 | A | * | 10/1924 | Sardeson et al. | 219/208 |
| 1,519,395 | A | | 12/1924 | Clench | |
| 1,546,959 | A | * | 7/1925 | Wilson | 219/208 |
| 1,759,389 | A | | 5/1930 | Bowen | |
| 1,816,850 | A | | 8/1931 | Hurd | |
| 1,850,156 | A | | 3/1932 | Richardson | |
| 1,985,830 | A | | 12/1934 | Powers | |
| 2,063,096 | A | * | 12/1936 | Heinbuch | 219/546 |
| 2,112,973 | A | * | 4/1938 | Nicosia | 219/205 |
| 2,205,145 | A | * | 6/1940 | Klingner | 123/145 A |
| 2,266,216 | A | | 12/1941 | Kimberlin | |
| 2,517,464 | A | * | 8/1950 | Corcoran | 123/142.5 R |
| 2,557,369 | A | | 6/1951 | Broderick | |
| 2,574,929 | A | * | 11/1951 | McClain | 392/489 |
| 2,589,566 | A | | 3/1952 | Neth et al. | |
| 2,640,138 | A | * | 5/1953 | Merritt | 392/489 |
| 2,686,863 | A | | 8/1954 | Chandler | |
| 2,712,815 | A | * | 7/1955 | Blessing | 123/142.5 E |
| 2,737,169 | A | * | 3/1956 | Kimberlin | 123/142.5 E |
| 2,745,941 | A | | 5/1956 | McElhaney | |
| 2,775,682 | A | | 12/1956 | Hynes | |
| 2,813,964 | A | | 11/1957 | Cerulli | |
| 2,825,791 | A | | 3/1958 | Jackson | |
| 2,834,865 | A | | 5/1958 | Coates | |
| 2,941,404 | A | * | 6/1960 | Woods | 60/530 |
| 3,171,016 | A | * | 2/1965 | Sukala | 219/208 |
| 3,209,123 | A | * | 9/1965 | Windsor | 219/208 |
| 3,353,000 | A | | 11/1967 | Tomlinson | |
| 3,435,404 | A | | 3/1969 | Kato | |
| 3,484,580 | A | | 12/1969 | Morgan | |
| 3,496,991 | A | * | 2/1970 | Barnd | 165/281 |
| 3,626,148 | A | | 12/1971 | Woytowich et al. | |
| 3,638,619 | A | | 2/1972 | Hall et al. | |
| 3,646,314 | A | * | 2/1972 | Windsor | 219/208 |
| 3,673,385 | A | | 6/1972 | Drugmand et al. | |
| 3,766,356 | A | * | 10/1973 | Feldmann | 219/208 |
| 3,810,497 | A | * | 5/1974 | Werner | 140/71 R |
| 3,868,494 | A | | 2/1975 | Pepin | |
| 3,919,520 | A | | 11/1975 | Pickard | |
| 3,969,605 | A | | 7/1976 | Danell | |
| 4,208,570 | A | * | 6/1980 | Rynard | 219/208 |
| 4,242,564 | A | * | 12/1980 | Kendall | 219/208 |
| 4,245,593 | A | | 1/1981 | Stein | |
| 4,286,139 | A | * | 8/1981 | Taylor | 219/208 |
| 4,377,737 | A | | 3/1983 | Berry | |
| 4,395,618 | A | | 7/1983 | Cunningham | |
| 4,419,567 | A | | 12/1983 | Murphy et al. | |
| 4,489,242 | A | | 12/1984 | Worst | |
| 4,514,617 | A | | 4/1985 | Amit | |
| 4,604,515 | A | | 8/1986 | Davidson | |
| 4,617,456 | A | | 10/1986 | Richards et al. | |
| 4,634,834 | A | * | 1/1987 | Lupoli et al. | 219/208 |
| 4,692,592 | A | * | 9/1987 | Kale | 392/450 |
| 4,732,229 | A | | 3/1988 | Lucht | |
| 4,770,134 | A | | 9/1988 | Foreman et al. | |
| 4,808,793 | A | * | 2/1989 | Hurko | 392/489 |
| 4,815,426 | A | * | 3/1989 | Henschel | 123/142.5 R |
| 4,835,365 | A | | 5/1989 | Etheridge | |
| 4,844,029 | A | * | 7/1989 | Suzuki | 123/142.5 E |
| 4,891,335 | A | | 1/1990 | McNeilly | |
| 4,974,664 | A | * | 12/1990 | Glennon et al. | 165/271 |
| 5,285,963 | A | * | 2/1994 | Wakefield et al. | 237/2 A |
| 5,400,432 | A | | 3/1995 | Kager et al. | |
| 5,408,960 | A | * | 4/1995 | Woytowich | 123/142.5 E |
| 5,438,642 | A | | 8/1995 | Posen | |
| 6,148,258 | A | * | 11/2000 | Boisvert et al. | 701/99 |
| 6,157,776 | A | | 12/2000 | Onken | |
| 6,215,310 | B1 | * | 4/2001 | Petrovich et al. | 324/378 |
| 6,243,535 | B1 | | 6/2001 | Bochud | |
| 6,289,177 | B1 | | 9/2001 | Finger et al. | |
| 6,314,930 | B1 | * | 11/2001 | Eller et al. | 123/145 A |
| 6,424,801 | B1 | | 7/2002 | Rabadi | |
| 6,598,671 | B1 | * | 7/2003 | Zeng et al. | 165/240 |
| 6,647,204 | B1 | | 11/2003 | Hutchinson | |
| 6,710,302 | B1 | * | 3/2004 | Rennick | 219/202 |
| 6,839,508 | B2 | * | 1/2005 | Biess et al. | 392/462 |
| 6,996,336 | B1 | | 2/2006 | Mahoney et al. | |
| 7,039,305 | B1 | | 5/2006 | Chen | |
| 7,082,904 | B2 | | 8/2006 | Takano | |
| 7,207,379 | B2 | | 4/2007 | Takano et al. | |
| 7,330,645 | B2 | | 2/2008 | Kwon | |
| 8,515,268 | B2 | | 8/2013 | Anliker | |
| 2002/0146244 | A1 | | 10/2002 | Thweatt, Jr. | |
| 2002/0162834 | A1 | * | 11/2002 | Asano et al. | 219/541 |
| 2002/0190049 | A1 | * | 12/2002 | Terada | 219/270 |
| 2003/0039474 | A1 | | 2/2003 | Eller et al. | |
| 2003/0194228 | A1 | * | 10/2003 | Bradenbaugh | 392/463 |
| 2004/0022529 | A1 | | 2/2004 | Lamb | |
| 2004/0170411 | A1 | * | 9/2004 | Kuebler et al. | 392/484 |
| 2006/0163235 | A1 | * | 7/2006 | Warren et al. | 219/202 |
| 2008/0083737 | A1 | | 4/2008 | Vu | |
| 2008/0156285 | A1 | | 7/2008 | King | |
| 2009/0139472 | A1 | * | 6/2009 | Gehres et al. | 123/41.08 |
| 2010/0059599 | A1 | | 3/2010 | King | |
| 2012/0223065 | A1 | | 9/2012 | King | |
| 2012/0224836 | A1 | | 9/2012 | King | |
| 2013/0016959 | A1 | | 1/2013 | King | |

FOREIGN PATENT DOCUMENTS

| | | | | | |
|---|---|---|---|---|---|
| JP | 57-173558 | | | 10/1982 | |
| JP | 2001123930 | A | * | 5/2001 | F02P 19/00 |
| KP | 10-2004-0001394 | A | | 1/2004 | |
| KR | 10-2004-0001395 | A | | 1/2004 | |
| KR | 10-2004-0061534 | A | | 7/2004 | |
| WO | WO-2008/000076 | A1 | | 1/2008 | |

OTHER PUBLICATIONS

International Preliminary Report on Patentability; PCT/CA2007/001145; 3 pages; Oct. 30, 2008.

U.S. Appl. No. 13/666,537, filed Nov. 1, 2012, King, Ray.

"Glow Plugs as Cooling Water Pre-Heater in Modern Diesel Cars (Type GN)"; BERU AG, Nov. 5, 2002. Archive.org Apr. 22, 2008. <http://web.archive.org/web/20021115200353/http://www.beru.com/english/produkte/gluehkerzen/gn.php>

"Internet Archive Wayback Machine." Archive.org Apr. 11, 2008. <http://web.archive.org/web/*/http://www.beru.com/english/produkte/gluehkerzen/gn.php>.

Office Action U.S. Appl. No. 13/507,604; Dec. 4, 2013; 14 pages.

US Office Action in U.S. Appl. No. 12/557,682, issued Jun. 19, 2013: 14 pages.

US Office Action in U.S. Appl. No. 13/064,075, issued Jul. 23, 2013; 8 pages.

* cited by examiner

ENGINE PRE-HEATER SYSTEM

This application is a Continuation-In-Part of U.S. application Ser. No. 11/427,545, filed Jun. 29, 2006, and now abandoned.

This invention relates generally to engine pre-heaters, and more particularly to an improved engine pre-heater system for heating engine coolant, and having easily removable and replaceable electric heating elements that can be installed or removed easily from within the engine pre-heater and having a greater surface area so as to contact the coolant flowing past and around it, therefore heating the coolant in a faster and more efficient manner. The engine pre-heater is also operably able to heat coolant, engine oil and transmission oil, therefore warming the engine in a faster and more efficient manner for quick start-ups.

DESCRIPTION OF THE PRIOR ART

It is well known that engines are difficult to start and subject to excessive wear when operated in cold, northern areas. Various kinds of engine pre-heaters that heat engine coolant and/or engine oil or fuel have been used to alleviate this problem. However, these pre-heaters have not always been reliable, or require the use of natural gas, propane, oil or other fuels to operate. As such, these types of devices are not environmentally friendly or pollution free.

Other types of engine pre-heaters have attempted to circumvent this problem by utilizing electrical elements internally positioned within the pre-heater, whereby coolant can be heated by the electrical element. U.S. Pat. No. 5,408,960 (Woytowich) and U.S. Pat. No. 4,770,134 (Foreman et al) are examples of such devices. However, these arrangements feature electrical elements that are internally positioned within the tank or chamber, and do not allow for easy removal of the electrical element from the pre-heater, should maintenance or replacement of the electrical element be required. Usually, removal of such engine preheating devices (or heating elements) can only be effected through complete disassembly of the housing or the destruction thereof, should maintenance or replacement of the electrical element be required. In such maintenance or replacement situations, the entire pre-heater would be required to be removed to access the internal electrical element, thereby making maintenance and replacement of such pre-heater components difficult and complicated.

Thus, there is a need for an improved, environmentally friendly engine pre-heater system which has a generally uncomplicated and simple design, which may have easily removable and replaceable electric heating elements that can be installed or removed easily from within the engine pre-heater and which are more durable and reliable to withstand the constant flow of coolant flowing around it over time. There is also a further need for an improved engine pre-heater system having electric heating elements with a greater surface area so as to contact the coolant flowing past and around it, therefore heating the coolant in a faster and more efficient manner. There is further a need for an improved engine pre-heater system which is also operably able to heat the coolant, engine oil and transmission oil, therefore heating the coolant and warming the engine in a faster and more efficient manner for quick start-ups. In this regard, the present invention substantially fulfills this need.

SUMMARY OF THE INVENTION

It is an object of the present invention to provide an improved, environmentally friendly engine pre-heater system which has a generally uncomplicated and simple design, which may have easily removable and replaceable electric heating elements that can be installed or removed easily from within the engine pre-heater and which are more durable and reliable to withstand the constant flow of coolant flowing around it over time.

It is another object of the present invention to provide an improved engine pre-heater system having electric heating elements with a greater surface area so as to contact the coolant flowing past and around it, therefore heating the coolant in a faster and more efficient manner.

It is another object of the present invention to provide an improved engine pre-heater system which is also operably able to heat the coolant, engine oil and transmission oil, therefore heating the coolant and warming the engine in a faster and more efficient manner for quick start-ups.

According to one aspect of the present invention, there is provided an engine pre-heater system for a vehicle comprising a housing having a passage extending therethrough for permitting a passage of coolant through the housing, the housing further comprising at least one opening defined therein separate from the passage; at least one electric heating element inserted into the at least one opening, the at least one electric heating element being removable without disassembly of the housing and having a substantially vertical upper stem body and an elongated lower end being connected thereto in a substantially perpendicular relationship to the upper stem body, the lower end being constructed and arranged for insertion into the at least one opening and projecting into the passage whereby the lower end is in direct contact with the coolant; an electrical power source constructed and arranged for connection to the heating element and a transmission fluid pan of the vehicle to provide electrical power thereto, and for enabling the heating element to directly heat the coolant and transmission oil in the transmission fluid pan of the vehicle, and wherein the electrical power source further comprises a first component positioned on an interior of the cab of the vehicle and a second component positioned on an interior of the engine housing for the vehicle, the first component being detachable from the second component; and a pump for circulating the coolant.

According to another aspect of the present invention, there is provided an engine pre-heater system for a vehicle comprising a housing having a passage extending therethrough for permitting a passage of coolant through the housing, the housing further comprising at least one opening defined therein separate from the passage; a pump for circulating the coolant through the housing; at least one electric heating element inserted into the at least one opening, the at least one electric heating element being removable without disassembly of the housing and having a substantially vertical upper stem body and an elongated lower end being connected thereto in a substantially perpendicular relationship to the upper stem body, the elongated lower end being constructed and arranged for insertion into the at least one opening and projecting into the passage whereby the lower end is in direct contact with the coolant, the elongated lower end having a tapered front portion for dividing the coolant flowing past in the housing whereby the divided coolant is in contact with, and heated by, both sides of an entire length of the elongated lower end; an electrical power source constructed and arranged for connection to each of the heating element, a transmission fluid pan of the vehicle and a car battery of the vehicle to provide electrical power thereto, and for enabling the heating element to directly heat the coolant and transmission oil in the transmission fluid pan of the vehicle, and wherein the electrical power source further comprises a first component positioned on an interior of the cab of the vehicle and a second component positioned on an interior of the engine housing for the vehicle, the first component being detachable from the second component; and a remote device for activating, at a distance from an interior of the vehicle, the electrical power source to provide the electrical power to each of the heating element, the transmission fluid pan of the vehicle and the car battery of the vehicle for pre-heating the engine and pre-heating the interior of the cab of a vehicle when an engine of the vehicle is not in operation.

The advantage of the present invention is that it provides an improved, environmentally friendly engine pre-heater system which has a generally uncomplicated and simple design, which may have easily removable and replaceable electric heating elements that can be installed or removed easily from within the engine pre-heater and which are more durable and reliable to withstand the constant flow of coolant flowing around it over time.

Yet another advantage of the present invention is to provide an improved engine pre-heater system having electric heating elements with a greater surface area so as to contact the coolant flowing past and around it, therefore heating the coolant in a faster and more efficient manner.

Yet another advantage of the present invention is to provide an improved engine pre-heater system which is also operably able to heat the coolant, engine oil and transmission oil, therefore heating the coolant and warming the engine in a faster and more efficient manner for quick start-ups.

BRIEF DESCRIPTION OF THE DRAWINGS

A preferred embodiment of the present invention is described below with reference to the accompanying drawings, in which.

DESCRIPTION OF THE PREFERRED EMBODIMENT

Figure 1:
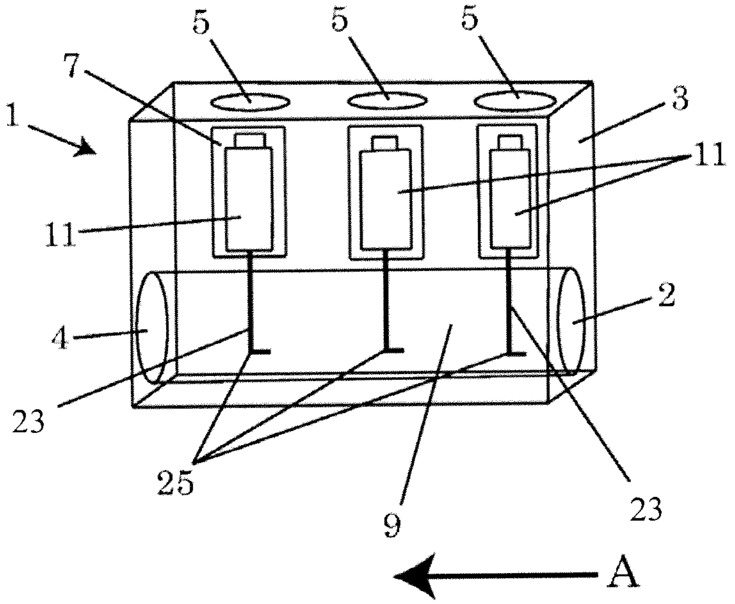
FIG. 1 is a perspective view of one embodiment of the housing of the engine pre-heater, illustrating the heating elements that are inserted therein to contact coolant flowing therethrough.

With reference to FIG. 1, there is shown an engine pre-heater system for a vehicle, illustrating the heating element which is inserted therein to contact coolant within the engine pre-heater, the engine pre-heater being designated in its entirety by the reference numeral 1. The pre-heater 1 is adapted to be attached to an engine (not shown) and connected to the engine's coolant system to heat the coolant and thereby keep the engine warm when activated to ensure a warm engine upon ignition. The pre-heater 1 comprises a housing 3 having a passage 9 extending therethrough for passage of coolant (not shown) through the housing. As can be seen in FIG. 1, the passage 9 of the housing 3 extends substantially horizontally throughout a length of the housing. The housing 3 further comprises at least one opening 5 on an upper surface of the housing 3, but more preferably, a plurality of openings defined thereon, each of which are separate from the passage 9, and each of which define an internally defined chamber 7 within the body of the housing 3, into which electric heating elements 11 are inserted through the opening 5 on the upper surface of the housing 3, so as to reside within the internally defined chambers 7. Preferably, the electric heating element 11 is a glow plug. With such heating elements 11, it can be seen that a stem 23 and a lower end 25 of the heating element 11 project vertically downwards into the passage 9 of the housing 3, whereby the heating element 11 is in direct contact with the coolant flowing through passage 9, (the directional passage flow of the coolant being shown as "A" in FIG. 1). As can also be readily seen in FIG. 1, the housing 3 possesses an inlet 2 at one end of the housing, and an outlet 4 at the opposite end of the housing. Preferably, the housing 3 is made of metal, though it is conceivable that other materials could also be utilized, as would be apparent to one skilled in the art.

Figure 2:
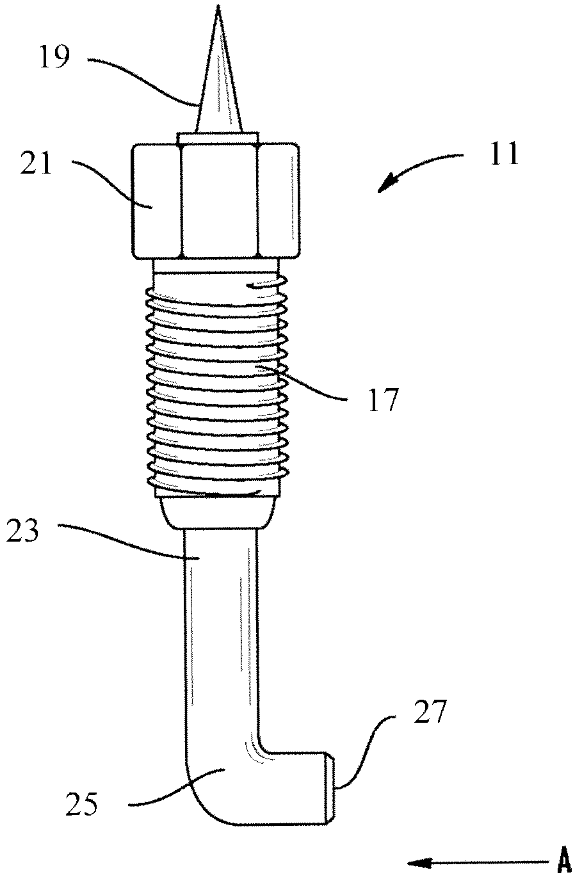
FIG. 2 is a perspective view of an embodiment of an embodiment of a heating element that is inserted into the housing of the engine pre-heater of the present invention.

As can be seen in FIG. 2, there is shown the electric heating element 11 that is inserted through the opening 5 on the upper surface of the housing 3, so as to reside within the internally defined chambers 7 within the body of the housing 3, as noted previously. Preferably, any of the electric heating elements 11 are easily removable and replaceable if required. When positioned within the internally defined chambers 7 within the body of the housing 3 of the engine pre-heater 1, as shown in FIG. 1, the electric heating element 11 comprises an elongated stem 23 that is inserted into chambers 7 of the housing 3. An upper end of the stem 23 comprises an electrical connection portion 19, which is connected to, and supplied with, electrical power from a power source (not shown) such as a battery for enabling the electric heating element 11 to heat the coolant (not shown), the coolant of course being circulated by pump (not shown). The electrical connection portion 19 will, preferably, be made of Inconel™, it being understood that this refers to a family of austenitic nickel chromium-based superalloys, which are typically used in high temperature applications. Common trade names for Inconel™ include: Inconel 625™, Chronin 625™, Altemp 625™, Haynes 625™, Nickelvac 625™ and Nicrofer 6020™, for example.

Surrounding a substantially middle portion of the stem 23 and the insulating sheath 21 is a threaded portion 17, by which the electric heating element 11 can be threadably fixed and inserted into chambers 7 of the housing 3. A lower end 25 of the stem 23 is L-shaped and projects into the passage 9 of the housing 3 whereby the electric heating element 11 is in direct contact with the coolant, the lower end thus being substantially perpendicular in relationship to the stem 23 and the remainder of the heating element 11, giving the lower end 25 of the heating element 11 a greater surface area with which to contact, and thus heat the coolant.

The outermost point 27 of the lower end 25 will preferably be tapered, at least slightly. In this manner, when the electric heating element 11 is inserted into chambers 7 of the housing 3, so as to project downwardly into the passage 9 of the housing 3 to be in direct contact with the coolant, the tapered outermost point 27 of the lower end 25 will act as a breakwater to the onrushing coolant flowing past it in the passage 9, (the directional passage flow of the coolant being shown as "A" in FIG. 2) separating the coolant and forcing the coolant to flow past both sides of the lower end 25. Such a construction is advantageous, when contrasted to that of a conventional heating element that merely extends downwardly into the passage, as when such an element is vertically positioned to extend downwardly within the passage, the vertical lower end is thus subjected to the stress of encountering fully the coolant flowing past within the passage 9 (the directional passage flow of the coolant being shown as "A" in FIGS. 1 and 2). Over time, such a construction means that such a heating element is subjected to greater structural stresses than that of the electric heating element 11 of the present invention, and likely will require more frequent replacement and potential for breakage.

Moreover, by virtue of the lower end 25 of the stem 23 being L-shaped, the lower end 25 possesses a greater surface area with which to contact, and thus heat the coolant. This effectively means that coolant can be heated at a faster rate than that accomplished by a conventional heating element, since coolant is separated and heated by both sides of the lower end 25, rather than just encountering, and being heated by, the immediate, and only, surface of a conventional heating element projecting downwardly in passage 9 to contact the flow of coolant. And, by virtue of the tapered outermost point 27 of the lower end 25 forcing the coolant to flow past both sides of the lower end 25, the lower end 25 is thus able to heat such coolant flowing past it in smaller quantities, since the coolant is effectively being split in half by the breakwater qualities of tapered outermost point 27, and the lower end 25 is effectively in contact with both halves of the coolant flowing past it.

Figure 3:
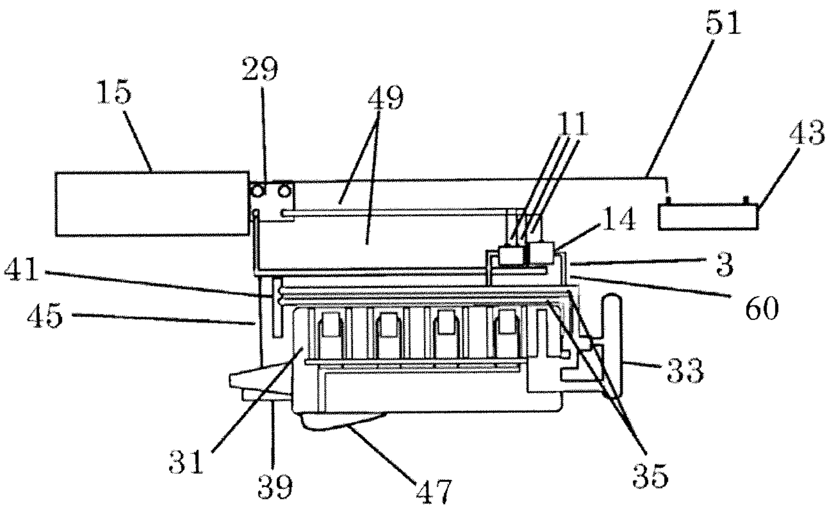
FIG. 3 is a schematic diagram of an embodiment of the engine pre-heater system of the present invention in place within a car engine.

FIG. 3 represents an electrical schematic diagram of one embodiment of an arrangement of the engine pre-heater system of the present invention. In a preferred embodiment, the engine pre-heater system of the present invention is designed to be interconnected with a car radiator 33 and an engine block 31 of a vehicle, the engine pre-heater system operating essentially as a distinct flow circuit for transferring coolant around the engine block 31. This separate flow circuit interconnects, through piping 35, the pump 14, housing 3, car radiator 33, electric heating elements 11, engine block 31 and heat emitting radiator 41.

The electric heating elements 11 in the housing 3 are supplied with electrical power from a power source 15 via conventional electrical wiring 49 for enabling the electric heating elements 11 to heat the coolant (not shown), the coolant of course being circulated by pump 14. In a preferred embodiment, the power source 15 is an electrical power pack, though it is conceivable that, alternatively, solar power cells, battery power, a/c power or the like could also be used, as would be apparent to one skilled in the art. Of course, it would be readily apparent that such a power source 15 could also be re-energized or re-charged also, as is known in the art. In a further preferred embodiment, the power pack 15 can easily be removed and replaced from the system, in order that a new one can be inserted. It will be understood that the power pack can be activated by a conventional switch in the cab of the vehicle, or by remote device, as would be understood by one skilled in the art.

It should be understood that the power source 15 also comprises, and is detachable from, AC plug 29, the power source 15 being present within the cab or interior of a vehicle, and the AC plug 29 being fixedly located adjacent to the cab on an interior of the engine housing for the vehicle. In this manner, if the power source 15 (the power pack) is to be detached from the AC plug 29 for replacement, the power pack 15 is detached from within the cab of the vehicle, while the AC plug 29 remains in place within the interior of the engine housing for the vehicle. The replacement power pack would then, of course, be attached to the AC Plug 29 for further use. The AC plug 29 interconnects, by way of electrical wiring 49, power from the power source 15 (once activated) to selectively heat electric heating elements 11, and a further electrical wire 45 also extends to selectively provide power that may be used to heat a transmission oil pan 39. An additional electrical wire 51 also extends to the car battery 43 to provide 1 amp of power continuously to the battery to keep the battery 43 charged. In this manner, when the power source 15 is activated, the electric heating elements 11 are utilized to warm the coolant.

Piping 35 is joined to the existing engine block 31 and the car radiator 33 to interconnect these elements to the housing 3 (holding the electric heating elements 11 therein) and the heat emitting radiator 41 to form the distinct flow circuit for transferring coolant therein, such coolant flow obviously being driven by means of pump 14. Pump 14 also ensures that a steady flow of coolant will be continuously passed through the piping 35 so as to enter the housing 3 to encounter electric heating elements 11 for heating. Generated heat from the heated coolant can be passed through piping 35 to the heat emitting radiator 41, where it is circulated to the interior or cab of the vehicle by means of a conventional fan or blower (not shown). Further, through the flow of warmed coolant (by way of electric heating elements 11) through the engine block 31, the engine oil pan 47 is also indirectly warmed, whereby warming of the engine can occur in a faster and more efficient manner for quick engine start-ups.

Figure 4:
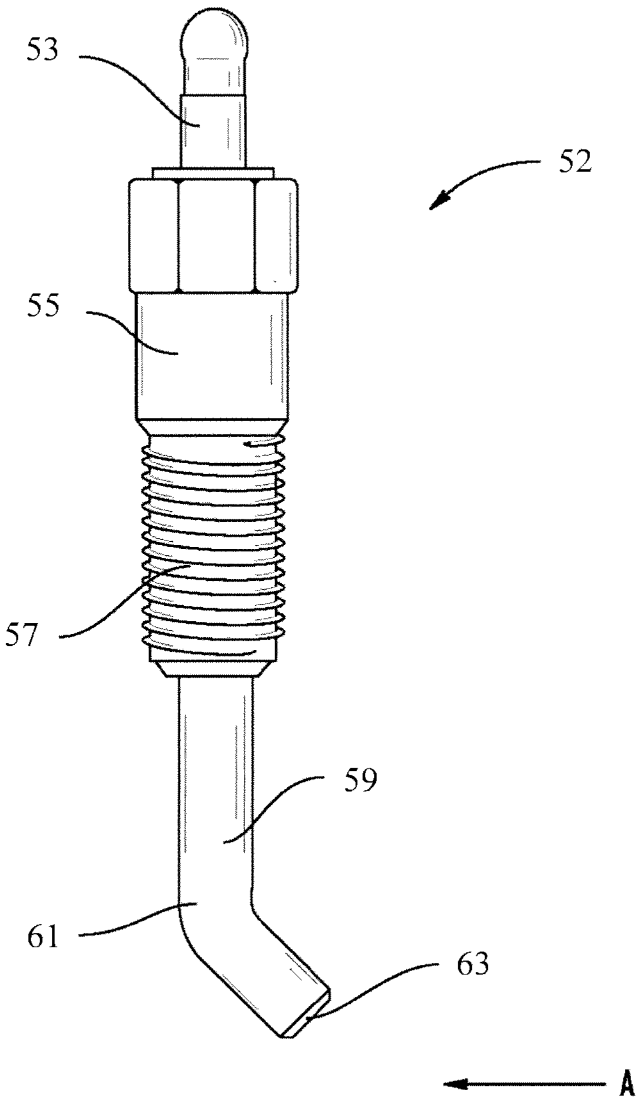
FIG. 4 is a perspective view of a further embodiment of an embodiment of a heating element that is inserted into the housing of the engine pre-heater of the present invention.

As can be seen in FIG. 4, there is shown an alternative embodiment of the electric heating element 52 that is inserted through the opening 5 on the upper surface of the housing 3, so as to reside within the internally defined chambers 7 within the body of the housing 3, as noted previously. Preferably, any of the electric heating elements 52 are easily removable and replaceable if required. When positioned within the internally defined chambers 7 within the body of the housing 3 of the engine pre-heater 1, as shown in FIG. 1, the electric heating element 52 comprises an elongated stem 59 that is inserted into chambers 7 of the housing 3. An upper end of the stem 59 comprises an electrical connection portion 53, which is connected to, and supplied with, electrical power from a power source (not shown) such as a battery for enabling the electric heating element 52 to heat the coolant (not shown), the coolant of course being circulated by pump (not shown). The electrical connection portion 53 will, preferably, be made of Inconel™, it being understood that this refers to a family of austenitic nickel chromium-based super-alloys, which are typically used in high temperature applications. Common trade names for Inconel™ include: Inconel 625™, Chronin 625™, Altemp 625™, Haynes 625™, Nickelvac 625™ and Nicrofer 6020™, for example.

Surrounding a substantially middle portion of the stem 59 and the insulating sheath 55 is a threaded portion 57, by which the electric heating element 52 can be threadably fixed and inserted into chambers 7 of the housing 3. A lower end 61 of the stem 59 is substantially angled at a 45 degree angle and projects into the passage 9 of the housing 3 whereby the electric heating element 52 is in direct contact with the coolant, the lower end thus being substantially perpendicular in relationship to the stem 59 and the remainder of the heating element 52, giving the lower end 61 of the heating element 52 a greater surface area with which to contact, and thus heat the coolant.

The outermost point 63 of the lower end 61 will preferably be tapered, at least slightly. In this manner, when the electric heating element 52 is inserted into chambers 7 of the housing 3, so as to project downwardly into the passage 9 of the housing 3 to be in direct contact with the coolant, the tapered outermost point 63 of the lower end 61 will act as a breakwater to the onrushing coolant flowing past it in the passage 9, (the directional passage flow of the coolant being shown as "A" in FIG. 4) separating the coolant and forcing the coolant to flow past both sides of the lower end 61. Such a construction is advantageous, when contrasted to that of a conventional heating element that merely extends downwardly into the passage, as when such an element is vertically positioned to extend downwardly within the passage, the vertical lower end is thus subjected to the stress of encountering fully the coolant flowing past within the passage 9 (the directional passage flow of the coolant being shown as "A" in FIGS. 1, 2 and 4). Over time, such a construction means that such a heating element is subjected to greater structural stresses than that of this embodiment of the electric heating element 52 of the present invention, and likely will require more frequent replacement and potential for breakage.

Moreover, by virtue of the lower end 61 of the stem 59 being substantially angled at a 45 degree angle, the lower end 61 possesses a greater surface area with which to contact, and thus heat the coolant. This effectively means that coolant can be heated at a faster rate than that accomplished by a conventional heating element, since coolant is separated and heated by both sides of the lower end 61, rather than just encountering, and being heated by, the immediate, and only, surface of a conventional heating element projecting downwardly in passage 9 to contact the flow of coolant. And, by virtue of the tapered outermost point 63 of the lower end 61 forcing the coolant to flow past both sides of the lower end 61, the lower end 61 is thus able to heat such coolant flowing past it in smaller quantities, since the coolant is effectively being split in half by the breakwater qualities of tapered outermost point 63, and the lower end 61 is effectively in contact with both halves of the coolant flowing past it. It will of course be understood that the lower end of the stem the electric heating element can be substantially angled at from between a 45 degree angle to a 90 degree angle when it is inserted into the housing to project into the passage.

The engine pre-heater system can be activated by a remote device (not shown) by a user, whereby the power source 15 can be activated to heat the electric heating elements 11, and the interconnected system, remotely at a distance from the vehicle, and this heat can then be transferred by way of the heat emitting radiator 41 into the cab or interior of the vehicle, pre-warming the engine and pre-heating the inside of the vehicle.

In another alternative embodiment of the present invention, coolant can be omitted, and dry heat, provided from the electric heating elements 11, can be utilized. In this embodiment (not shown) the housing would preferably have an air passageway extending therethrough for passage of air through the housing, the housing further comprising openings defined therein separate from the air passageway. Electric heating elements would be inserted and mounted into the openings, the heating so as to project into the the air passageway of the housing whereby the electric heating elements are in direct contact with air in the air passageway. A power source in communication with the heater assembly supplies the electric heating elements with power, for enabling the electric heating elements to heat the air in the air passageway. An air blower, for example, or other such device, could then direct the heated air from the air passageway to an area external to the heater assembly, such as a house or other enclosed structure, the air blower being supplied with power from the power source.

In an alternative embodiment, as shown in FIG. 3, the pre-heater can further comprise a thermostatic control 60 in association with the electric heating elements 11 and the coolant in the housing, wherein the thermostatic control is adapted to deactivate the electric heating elements 11 when a temperature of the engine coolant exceeds a pre-determined level. Preferably, the thermostatic control is positioned relative to the inlet of the housing. Further, the thermostatic control can also thus turn the electric heating elements 11 on when a temperature of the engine coolant falls below a predetermined level.

The present invention has been described herein with regard to preferred embodiments. However, it will be obvious to persons skilled in the art that a number of variations and modifications can be made without departing from the scope of the invention as described herein.

I claim:

1. An engine pre-heater system for a vehicle comprising:

a housing interconnected with a radiator and engine block of the vehicle to form a fluid flow circuit and having a passage extending therethrough for permitting a passage of coolant through the housing, the housing having at least one opening defined thereon which is in communication with the passage;

at least one heating element inserted into the at least one opening of the housing and having a substantially vertical upper stem body and an elongated lower end being connected thereto in a substantially perpendicular relationship to the substantially vertical upper stem body, the elongated lower end being constructed and arranged for insertion into the at least one opening and projecting into the passage whereby the elongated lower end is in direct contact with the coolant in the passage; wherein the connection portion of the heating element is made of austenitic nickel chromium-based super-alloys; and wherein the substantially vertical upper stem body is accessible from an exterior surface of the housing to permit removal of the at least one heating element from the housing without disassembly of the housing and without disconnection of the housing from the fluid flow circuit;

an electrical power source constructed and arranged for connection to the at least one heating element to provide electrical power thereto, and for enabling the at least one heating element to directly heat the coolant;

a pump in communication with the pre-heater system for continuously circulating the coolant throughout the fluid flow circuit; and a heat transfer means connected to the fluid flow circuit, the heat transfer means being configured to transfer heat from the heated coolant flowing in the fluid flow circuit to a space heated by the pre-heater system; wherein the electrical power source is at least one of a power pack and an electrical battery.

2. The engine pre-heater system of claim 1, wherein the housing is adapted to be mounted generally horizontally.

3. The engine pre-heater system of claim 1, wherein the housing further comprises an inlet adjacent one end of the housing for flow of coolant into the housing and an outlet adjacent the opposite end of the housing for flow of the heated coolant out of the housing.

4. The engine pre-heater system of claim 1, wherein the at least one heating element is a glow plug.

5. The engine pre-heater system of claim 1, further comprising a thermostatic control in association with the at least one heating element and the coolant in the housing, wherein the thermostatic control is adapted to turn the at least one heating element off when a temperature of the coolant exceeds a pre-determined level.

6. The engine pre-heater system of claim 5, wherein the thermostatic control is positioned relative to an inlet of the housing.

7. The engine pre-heater system of claim 5, wherein the thermostatic control is adapted to turn the at least one heating element on when a temperature of the coolant falls below a pre-set level.

8. The engine pre-heater system of claim 1, wherein the passage of the housing extends substantially horizontally throughout a length of the housing.

9. The engine pre-heater system of claim 1, wherein the housing comprises a plurality of openings defined therein, each of which are separate from the passage and each having a corresponding heating element inserted therein.

10. The engine pre-heater system of claim 1, further comprising a remote device for activating, at a distance from an interior of the vehicle, the electrical power source to provide the electrical power to the at least one heating element for pre-heating the engine and pre-heating an interior of the vehicle when an engine of the vehicle is not in operation.

11. The engine pre-heater system of claim 1, wherein the electrical power source is further constructed and arranged for connection to a car battery of the vehicle, for providing electrical power thereto.

12. The engine pre-heater system of claim 1, wherein the elongated lower end of the at least one heating element is connected to the substantially vertical upper stem body at a substantially angled relationship, in a range of between 45 degrees to 90 degrees.

13. An engine pre-heater system for a vehicle comprising:

a housing interconnected with a radiator and engine block of the vehicle to form a fluid flow circuit and having a passage extending therethrough for permitting a passage of coolant through the housing, the housing having at least one opening defined thereon which is in communication with the passage;

at least one heating element inserted into the at least one opening of the housing and having a substantially vertical upper stem body and an elongated lower end being connected thereto in a substantially perpendicular relationship to the substantially vertical upper stem body, the elongated lower end being constructed and arranged for insertion into the at least one opening and projecting into the passage whereby the elongated lower end is in direct contact with the coolant in the passage; wherein the connection portion of the heating element is made of austenitic nickel chromium-based super-alloys; and wherein the substantially vertical upper stem body is accessible from an exterior surface of the housing to permit removal of the at least one heating element from the housing without disassembly of the housing and without disconnection of the housing from the fluid flow circuit;

an electrical power source constructed and arranged for connection to the at least one heating element to provide electrical power thereto, and for enabling the at least one heating element to directly heat the coolant;

a pump in communication with the pre-heater system for continuously circulating the coolant throughout the fluid flow circuit; and a heat transfer means connected to the fluid flow circuit, the heat transfer means being configured to transfer heat from the heated coolant flowing in the fluid flow circuit to a space heated by the pre-heater system a remote device for activating, at a distance from an interior of the vehicle, the electrical power source to provide the electrical power to the at least one heating element for pre-heating the engine and pre-eating an interior of the vehicle when an engine of the vehicle is not in operation.

* * * * *

UNITED STATES PATENT AND TRADEMARK OFFICE

CERTIFICATE OF CORRECTION

PATENT NO. : 8,933,372 B2
APPLICATION NO. : 12/457397
DATED : January 13, 2015
INVENTOR(S) : Ray King It is certified that error appears in the above-identified patent and that said Letters Patent is hereby corrected as shown below:

In the Claims

In Claim 13, Column 10, Line 32, delete the word "pre-eating" and insert the word --pre-heating--.

Signed and Sealed this
Twenty-first Day of July, 2015

Michelle K. Lee

Michelle K. Lee
*Director of the United States Patent and Trademark Office*